United States Patent
Christenbury et al.

(10) Patent No.: US 9,403,332 B2
(45) Date of Patent: Aug. 2, 2016

(54) TIRE TREAD WITH SIPES AND A METHOD FOR THE MANUFACTURE OF A TIRE TREAD WITH SIPES

(75) Inventors: Damon Lee Christenbury, Fountain Inn, SC (US); Cyril Guichon, Greer, SC (US); Daniel Rey, Greer, SC (US); Ronald Hobart Thompson, Greenville, SC (US)

(73) Assignees: Michelin Recherche et Technique S.A. (CH); Societe de Technologie Michelin (FR)

( * ) Notice: Subject to any disclaimer, the term of this patent is extended or adjusted under 35 U.S.C. 154(b) by 318 days.

(21) Appl. No.: 13/882,045

(22) PCT Filed: Oct. 27, 2010

(86) PCT No.: PCT/US2010/054227
§ 371 (c)(1),
(2), (4) Date: Apr. 26, 2013

(87) PCT Pub. No.: WO2012/057742
PCT Pub. Date: May 3, 2012

(65) Prior Publication Data
US 2013/0213543 A1    Aug. 22, 2013

(51) Int. Cl.
*B29D 30/52*    (2006.01)
*B29D 30/68*    (2006.01)
*B29D 30/06*    (2006.01)
(Continued)

(52) U.S. Cl.
CPC ............ *B29D 30/0681* (2013.01); *B29D 30/52* (2013.01); *B29D 30/68* (2013.01); *B60C 11/0041* (2013.04); *B60C 11/1204* (2013.04); *B29D 2030/685* (2013.01); *B60C 11/12* (2013.01)

(58) Field of Classification Search
CPC ... B29D 30/52; B29D 30/68; B29D 2030/685
USPC .............................................. 156/123, 128.1
See application file for complete search history.

(56) References Cited

U.S. PATENT DOCUMENTS

| 2,109,691 | A | * | 3/1938 | D'Ayguesvives | ........ 152/209.18 |
| 2,907,365 | A | * | 10/1959 | MacDonald | ........ B60C 11/0309 |
| | | | | | 152/209.6 |
| 3,472,714 | A | * | 10/1969 | Ragan | ............................. 157/13 |

(Continued)

FOREIGN PATENT DOCUMENTS

DE    19642283 A1    4/1998
DE    19822323        12/1999
(Continued)

OTHER PUBLICATIONS

English machine translation of FR742981, dated Mar. 1933.*
(Continued)

*Primary Examiner* — Steven D Maki
*Assistant Examiner* — Robert Dye
(74) *Attorney, Agent, or Firm* — Dority & Manning, P.A.

(57) ABSTRACT

A tire with certain tread features and a method for manufacturing the tread for such a tire are provided. More particularly, a tire and method for manufacturing a tire having a tread portion with sipes that can be of minimal thickness and varying geometries, densities, and profiles may be provided. The sipes can also be hidden until after a period of tread wear has occurred.

12 Claims, 2 Drawing Sheets

(51) Int. Cl.
B60C 11/00 (2006.01)
B60C 11/12 (2006.01)

(56) References Cited

U.S. PATENT DOCUMENTS

| | | | |
|---|---|---|---|
| 3,814,160 A | 6/1974 | Creasey | |
| 4,024,895 A | 5/1977 | Barron | |
| 4,040,464 A | 8/1977 | Skidmore | |
| 4,073,330 A | 2/1978 | Allard | |
| 4,226,274 A | 10/1980 | Awaya et al. | |
| 4,564,737 A | 1/1986 | Burke et al. | |
| 5,221,382 A | 6/1993 | Sid-Ahmed | |
| 5,303,756 A | 4/1994 | Hill | |
| 5,478,426 A | 12/1995 | Wiler et al. | |
| 6,220,199 B1 | 4/2001 | Williams | |
| 6,481,480 B1 | 11/2002 | Schuster et al. | |
| 6,951,235 B2 | 10/2005 | Kawashima et al. | |
| 7,013,939 B2 | 3/2006 | Rhyne et al. | |
| 7,766,061 B2 | 8/2010 | Mayni et al. | |
| 2003/0213545 A1 | 11/2003 | Majumdar et al. | |
| 2004/0231779 A1 | 11/2004 | Girard et al. | |
| 2006/0005912 A1 | 1/2006 | Weydert et al. | |
| 2007/0144641 A1 | 6/2007 | Nguyen | |
| 2007/0152362 A1 | 7/2007 | Greenwell et al. | |
| 2008/0023116 A1 | 1/2008 | Mayni et al. | |
| 2010/0116439 A1 | 5/2010 | Lundell | |
| 2011/0277898 A1* | 11/2011 | Barraud et al. | 152/209.18 |
| 2012/0145334 A1* | 6/2012 | Pallot et al. | 157/13 |

FOREIGN PATENT DOCUMENTS

| | | | |
|---|---|---|---|
| DE | 20319521 U1 | | 5/2005 |
| EP | 0073313 B1 | | 12/1986 |
| EP | 0714724 A2 | | 6/1996 |
| EP | 0768518 B1 | | 7/2003 |
| FR | 742981 | * | 3/1933 |
| FR | 2940185 | * | 6/2010 |
| GB | 1257017 | | 12/1971 |
| JP | 62-030904 | | 2/1987 |
| JP | 62-286805 | | 12/1987 |
| JP | 02-246809 | | 2/1990 |
| JP | 02-246809 | * | 10/1990 |
| JP | 03-010906 | * | 1/1991 |
| JP | 3-153406 A | | 7/1991 |
| JP | 2001-187516 | | 12/1999 |
| JP | 2005-193853 | | 9/2004 |
| JP | 2007-168438 | | 12/2006 |
| JP | 2007-261093 | * | 10/2007 |
| KR | 10-2009-0095370 | | 9/2009 |
| KR | 10-2008-0081560 | | 9/2010 |
| WO | WO 2004/096583 A1 | | 11/2004 |
| WO | WO 2010/059162 | | 5/2010 |
| WO | WO2010/102975 | * | 9/2010 |
| WO | WO 2012/057847 | | 5/2012 |

OTHER PUBLICATIONS

English machine translation of JP2007-261093, dated Oct. 2007.*
International Search Report for International Application No. PCT/US2010/54227, dated Dec. 20, 2010.
International Search Report for International Application No. PCT/US2011/029580, dated May 20, 2011.
Citation of Patent Applications Form.
Christenbury et al., U.S. Appl. No. 13/882,080, filed Apr. 26, 2013, A Tire Tread with Apertures and a Method for the Manufacture of a Tire Tread with Apertures.

* cited by examiner

TIRE TREAD WITH SIPES AND A METHOD FOR THE MANUFACTURE OF A TIRE TREAD WITH SIPES

FIELD OF THE INVENTION

The present invention relates to a tire with certain tread features and for a method for manufacturing such a tire and, more particularly, to a tire having a tread portion with sipes that can be of minimal thickness and/or may be hidden until after a period of tread wear.

BACKGROUND OF THE INVENTION

The tread of a tire is commonly provided with various features that can improve performance as well as impact the aesthetics of the tread. For example, a tread may include blocks of tread and/or ribs; grooves along the lateral and circumferential directions, and/or apertures of various sizes. These features can improve tread wear, handling, braking, consumer appeal and other characteristics of the tire as well.

A sipe is another feature that is frequently applied to a tire tread. As used herein, a sipe is a groove in the tread that is less than 2 mm in width. In addition to tire aesthetics, sipes can be used to improve e.g., wet and snow traction. For example, sipes of various sizes and orientations may be added to the ribs and/or blocks of a tire in varying configurations to improve the ability of the tire to grip the road surface in rain or snow. However, sipes typically increase the rolling resistance of a tire particularly as the tire tread becomes less rigid through the addition of sipes. This effect can be countered in part by decreasing the width of the individual sipes manufactured into the tread.

In a conventional approach, sipes are added to the tire during the curing process. More specifically, first an uncured tire (i.e. a green tire) is created on a tire forming drum in a layered process where sheets of material are added in steps along with other components such as e.g., the bead cores, belts, and/or other components. A tread band is provided for a tread region. The materials are sequentially applied to a forming drum that initially provides a flat surface but ultimately moves the beads together to form the toroidal tire shape.

The resulting green tire is then placed into a curing press where heat and pressure are used to cure the tire rubber components as well as bond the rubber components together. During this curing step, the walls of the press can be equipped with intricate molding elements that impart sipes into the uncured tread of the green tire. For example, fin-like metal projections may be added to the walls of the tire press in the tread forming section in order to impart sipes and other details to the tread as the tread is cured by pressure and heat.

The conventional manufacture of a tire with a sipes along the tread presents certain challenges. The nature of the molding process limits the shape and configuration of sipes that can be added to the tire tread using the insertion of the fin-like metal projections on the walls of the curing press. The conventional tire press can create sipes that extend from the outer surface of the tread inward, but cannot create sipes in the tire tread that appear only after a period of tread wear has occurred, i.e. hidden sipes. Similarly, sipes can be created that extend radially outward from the innermost portion of the tread but conventional methods cannot create, a sipe that is hidden from the bottom and top portion of the tread—i.e. conventional methods cannot create a sipe that does not extend from either the radially innermost or radially outermost surface of the tread. In addition, the manufacture of very thin sipes using standard molding techniques is fraught with difficulties due to the fragility of mold elements like cores and/or fins needed to make such sipes.

Accordingly, a tire and a method of making a tire having sipes would be useful. More particularly, a method that can be used to construct a tire having sipes of very thin widths and/or hidden sipes would be particularly beneficial. Such a method that can also be used to create sipes of varying geometries, densities, and depths while still allowing for control of the rigidity of the tire tread so as to improve rolling resistance would also be useful.

SUMMARY OF THE INVENTION

Aspects and advantages of the invention will be set forth in part in the following description, or may be obvious from the description, or may be learned through practice of the invention.

In one exemplary aspect, a method of manufacturing a tread portion of a tire is provided. The method includes the steps of placing a layer of uncured tire rubber onto a surface; cutting the layer of uncured tire rubber to create at least one incision in a predetermined shape in the layer of uncured tire rubber; curing a portion of the layer of uncured tire rubber adjacent to the incision and without curing all of the layer of uncured tire rubber; repeating the steps of placing a layer, cutting the layer, and curing a portion of the layer using one or more additional layers of uncured tire rubber until the tread portion having a predetermined thickness is formed and at least one sipe is created by incisions in adjacent layers of the uncured tire rubber; and curing the remainder of the layers of uncured tire rubber without eliminating the incisions in the layers of uncured tire rubber. The steps of cutting and curing may be executed separately or concurrently.

By way of example, during the steps of this exemplary method of manufacturing a tread portion of a tire, the amount of the portion of the layer of uncured tire rubber adjacent to the incision that is cured can be the minimum amount needed to prevent the incision from being eliminated during the step of curing the remainder of the layers of uncured tire rubber.

As part of this exemplary method of manufacturing, the layers of uncured tire rubber may be placed onto a surface supported by a tire forming drum. Alternatively, the layers of uncured tire rubber may be placed onto a tire intermediate. As such, the step of curing the remainder of the tread portion may include placing the tread portion and the tire intermediate into a curing press.

The step of cutting can include raising the temperature of the portion of the layer of uncured tire rubber above its curing temperature.

During the step of repeating, the position of the at least one incision created by the cutting step can be moved to a different position on subsequent layers of the uncured tire rubber so as to e.g., affect the geometry or profile of a cross-section of the sipe as desired.

The step of cutting the layer of uncured tire rubber to create at least one incision may include creating a plurality of incisions along the layer of uncured tire rubber.

The step of repeating may also be used to create a plurality of sipes through the layers of uncured tire rubber.

The tread portion from the curing step can be affixed to a buffed tire so as to retread the tire as part of retreading operation or the tread portion can be cured along with a tire intermediate so to provide a new tire.

This exemplary method of the present invention may be used to create sipes that are initially hidden from view and become visible and/or operable after a certain amount of tread wear has occurred.

In another exemplary embodiment of the present invention, a tire having certain tread features is provided. The tire includes a tread portion having a plurality of layers of rubber material. At least one sipe is formed by incisions that were separately created in each layer of at least a portion of the plurality of layers of rubber material. The layers of rubber material are bonded together by curing and without eliminating the at least one sipe.

The at least one sipe can be covered by one or more layers of rubber material such that the at least one sipe is hidden until after a certain amount of tread wear has occurred through use of the tire. The at least one sipe can include a plurality of sipes created by multiple incisions that were separately created in each layer of at least a portion of the plurality of layers of rubber material. The plurality of sipes can create a Y-shaped profile in appearance when the tread portion is viewed along a toroidal cross section of the tire. Alternatively, or in addition thereto, the plurality of sipes can be of varying depths when the tread portion is viewed along a toroidal cross section of the tire. The multiple incisions that create the plurality of sipes can vary in density as function of the depth of the tread portion as viewed along a toroidal cross section of the tire. The plurality of sipes can create a non-linear profile in appearance when the tread portion is viewed along a toroidal cross section of the tire.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

The present invention provides a tire having certain tread features and provides a method of making a tire having such tread features. More specifically, the present invention provides for the making of a tire having sipes that can have a very minimal thickness, complex geometries, and/or remain hidden from view until a certain amount of tread wear has occurred through use of the tire. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
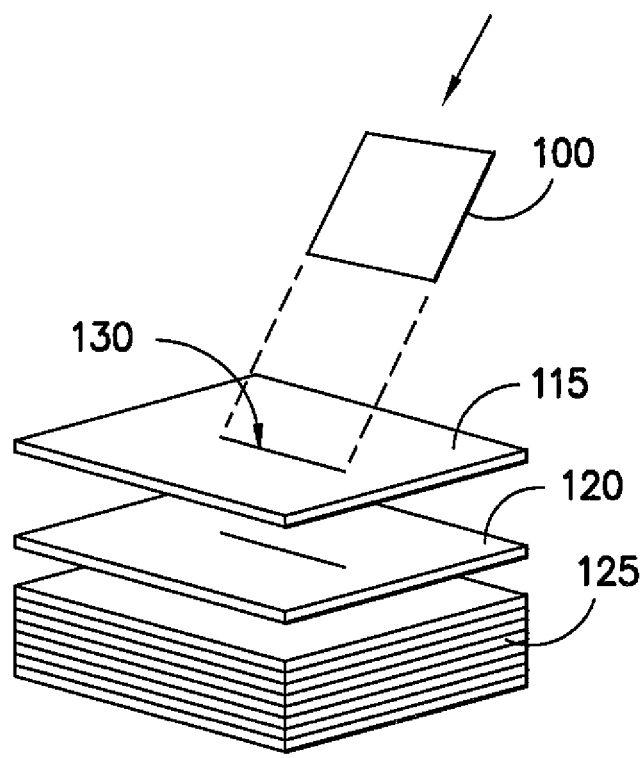
FIG. 1 provides an illustration of an exemplary method of the present invention, in which incisions are made in successive layers of material used for constructing the tread portion of a tire.

FIG. 1 provides an illustration that will be used in describing an exemplary method of the present invention. Layer 115 is a sheet of tire rubber that will be used to construct a tread portion of a tire. As used herein, "uncured" or "green" means that the tire rubber has not been vulcanized, a known process in which pressure and heat are applied to cause polymer chains in the rubber to cross-link. "Tire rubber" as used herein is not limited to just natural rubber and refers instead to numerous formulations of rubber, other polymers, carbon black, and other materials that may be used for forming and creating the elements of a tire such as the tread portion. "Tread portion" as used herein refers to a portion of tire rubber positioned on the outer circumference of the tire and intended for contact with the ground as the tire rolls across. Tread portion can have varying thicknesses and widths depending upon, e.g., the vehicle and use intended for the tire.

Additional layers 120 and 125 of tire rubber appear below layer 115. These layers are sequentially placed onto one another (i.e. stacked) in order to create a tread portion of the desired thickness. For example, layers 115, 120, and 125 might be placed on a tire forming drum or on a tire intermediate such as a belt or carcass that has been placed on a tire forming drum. Alternatively, instead of being placed onto a tire forming drum, layers 115, 120, 125 might be placed onto a building surface used to create only a tread belt. As will be understood by one of skill in the art, a tread belt can be placed e.g., onto a buffed tire in order to retread a tire. Only a portion of layers 115, 120, and 125 are shown in FIG. 1, it being understood by one of skill in the art that such layers would e.g., extend a certain length and width as required for extending around the circumference of a tire to provide for ground contact. The number of such layers 115, 120, and 125 that are used will help determine the thickness of the tread portion.

As shown for layers 115 and 120, such layers include a cut or incision 130. As used herein, incision 130 is simply a small groove or channel that is made in a layer of tire rubber. Although shown as a straight line, incisions 130 can be applied in various other predetermined shapes as needed in order to create the sipe that is desired. For example, various curves, angles, and other features may be added to the shape of incisions 130.

In order to create incision 130, a heated knife or blade 100 is inserted as shown in FIG. 1 for layer 115. Blade 100 is e.g., a relatively thin, metal element that cuts through layer 115 by pressing against and through layer 115 as shown by the arrow. The shape of blade 100 determines the shape of the resulting incision 130, Importantly, before application of blade 100, layers 115, 120, and 125 are uncured tire rubber. Blade 100 is heated to a temperature such that during cutting of e.g., layer 115 by pressing into contact with blade 100, sufficient heat is transferred to layer 115 to cure a portion of layer 115 that is adjacent to incision 130. The amount of heat provided by blade 100 does not cure all of layer 115. Rather, only a portion of layer 115 that is adjacent to incision 130 is cured by the heat from blade 100. More specifically, and by way of example, the minimum portion of layer 115 that should be cured is only so much as will prevent incision 130 from being eliminated during a subsequent curing step (further discussed below) that is used to bond layers 115, 120, and 125 together and/or to the other elements of a tire. More than this minimum amount may be cured, provided layers 115, 120, and 125 can still be bonded together during the subsequent curing step. For example, in one exemplary embodiment, blade 100 is heated to a temperature in the range of about 180 to 260 degrees Celsius.

It should be understood that blade 100 is provided by way of example. Blades 100 of various other shapes may also be used. In addition, as will be understood by one of skill in the art using the teachings disclosed herein, other tools or techniques may be used to create incision 130 and cure a portion of the layer of otherwise uncured tire rubber adjacent to incision 130. For example, curing could be done chemically after the cutting step or the area near the incision could be cauterized after creating the incision using a heating element. Other techniques may be used as well as will be understood by one of ordinary skill in the art using the teachings disclosed herein.

By repeating the process of placing layers of uncured tire rubber onto each other and creating incisions by cutting one or more of the layers while curing a portion of the layer as described, a sipe can be constructed from the stacking of incisions 130 in the various layers of uncured tire rubber. Importantly, by varying the shape of incisions 130 and the relative placement of incisions 130 in the sequentially added layers 115, 120, and 125, multiple sipes of complex geometries and varying depths can be created.

Figure 2:
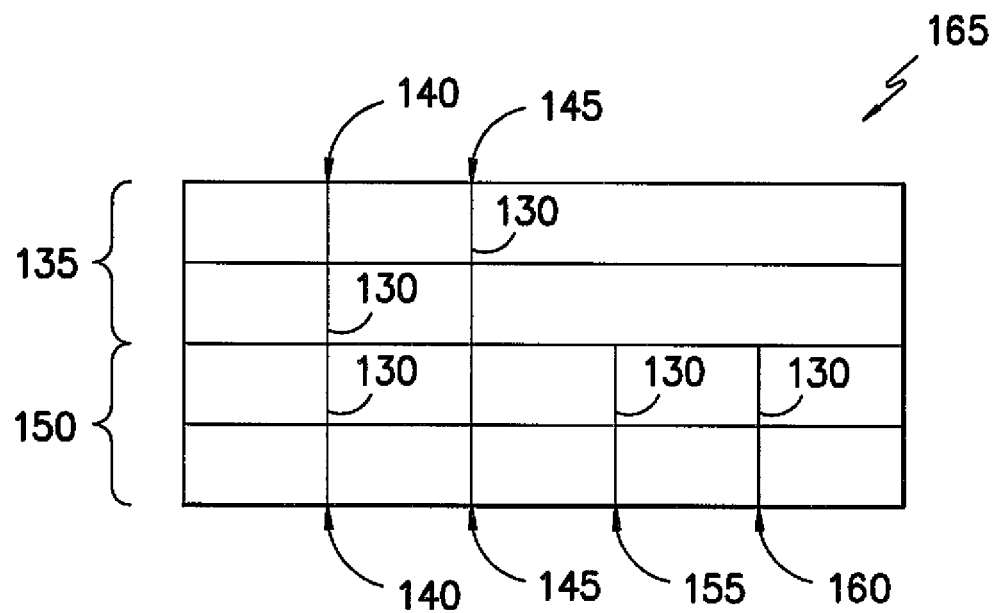
FIG. 2 provides an illustration of an exemplary embodiment of a tread according to the present invention as viewed along a toroidal cross-section of a portion of a tread.

For example, referring now to FIG. 2, an exemplary embodiment of a portion 165 of a tread as viewed along a toroidal cross-section is provided. The tread portion 165 includes layers 135 and 150 provided with incisions 130 as previously described. Layers 135 are towards the outer part of the tread portion 165 while layers 150 are towards the inner part of tread portion 165, it being understood that "inner" and "outer" are with reference to the radial position such layers would have when tread portion 165 is in place on a tire.

Incisions 130 in the various layers 135 and 150 form sipes 140, 145, 155, and 160. More specifically, sipes 140 and 145 are formed by adjoining and/or stacking the incisions 130 among the layers 135 and 150. Similarly, sipes 155 and 160 are formed by adjoining the incisions 130 in layers 150. Because incisions 130 were cut while also curing the tire rubber adjacent thereto in layers 135 and 150, incisions 130 will not be eliminated when tread portion 165 is subsequently cured. Such curing step might include placement in a tire press in order to cure and join layers 135 and 150 to each other and/or to a tire intermediate. Alternatively, layers 135 and 150 might be cured in order to create a tread band for placement on a buffed tire as part of a retreading operation as will be understood by one of skill in the art.

Still referring to FIG. 2, it should be noted that sipes 155 and 160 are contained only with inner layers 150 and not outer layers 135. Accordingly, in the early life of a tire having tread portion 165, only sipes 140 and 145 are visible and in operation to provide improved traction in the use of the tire. As the tire is used and tread wear occurs, layers 135 are slowly removed to eventually reveal sipes 155 and 160. These sipes 155 and 160 thereby provide improved traction while, at the same time, the rigidity of the tread portion 165 is controlled as a function of tread depth in order to minimize an unwanted effect on rolling resistance. Thus, the present invention allows for greater control over the number, positioning, density, and profile of the sipes as a function of tread depth in the design and construction of a tire. In addition, incisions 130 can be constructed with a near zero thickness, so that energy loss from rolling resistance can be further minimized.

Figure 3:
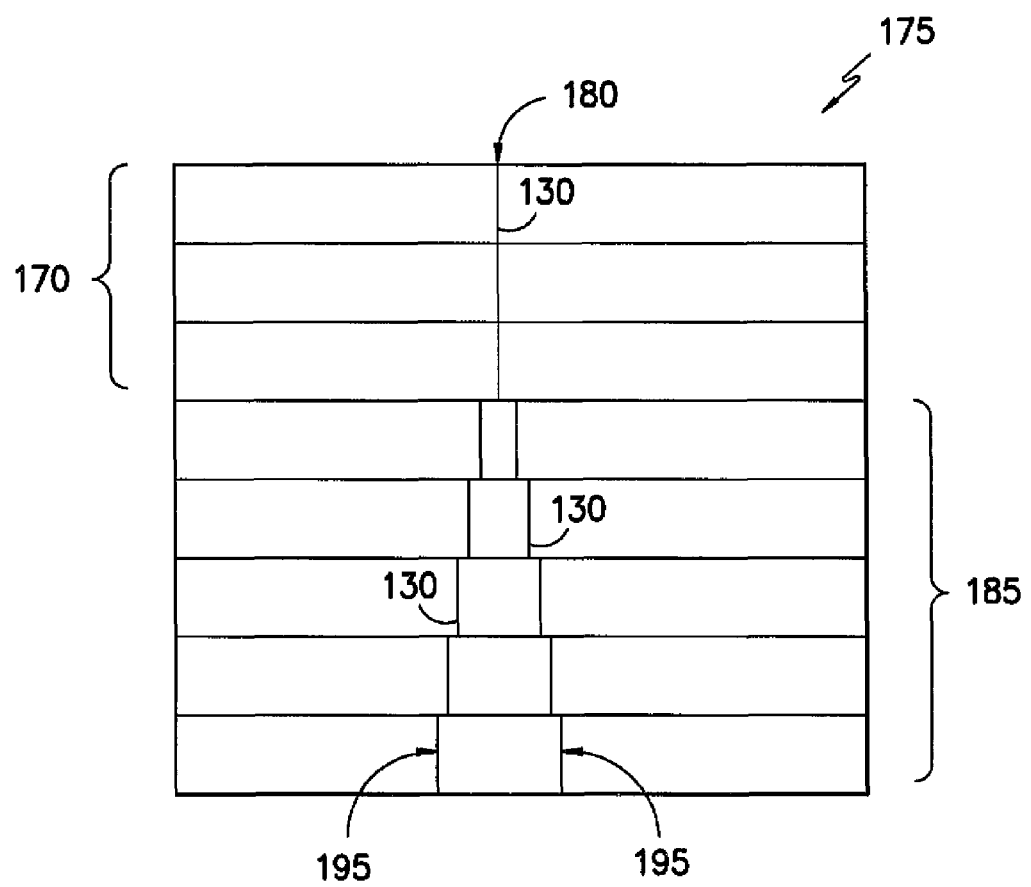
FIG. 3 provides another illustration of an exemplary embodiment of a tread according to the present invention as viewed along a toroidal cross-section of a portion of a tread.

FIG. 3 provides another exemplary embodiment of a tread portion 175 as viewed along a toroidal cross-section. Tread portion 175 is created from outer layers 170 and inner layers 185. Notably, tread portion 175 is thicker than tread portion 165 as shown in FIG. 2. Other thicknesses may be used as desired depending upon the intended application.

Tread portion 175 is constructed as previously described from uncured tire rubber layers 170 and 185 that have been sequentially placed, or layered, onto one another. Incisions 130 have cut into layers 170 and 185 while curing a portion of such layers to prevent elimination of incisions 130 in subsequent curing. Tread portion 175 includes sipe 180 and a pair of sipes 195. As seen in FIG. 3, sipes 180 and 195 create a non-linear or Y-shaped profile (unlike FIG. 2, which presented linear sipes 140, 145, 155, and 160). Such effect is realized by changing the relative positions along the layers of incisions 130 as tread portion 175 is constructed through the addition of successive layers 170 and 185.

As a tire bearing tread portion 175 is used, initially only sipe 180 will be visible and operating to effect e.g., wet and snow traction. However, as tread portion 175 wears and removes layers 170, the pair of sipes 195 will become exposed and operable for improving traction performance. In addition, the separation between the pair of sipes 195 will increase with wear as layers 185 are removed during use from tread portion 175.

The embodiments provided in FIGS. 2 and 3 are by way of example only. Using the teachings disclosed herein, it will be understood that other variations in e.g., the depth, shape, number, and density of the sipes may be created with the present invention. More particularly, while the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of manufacturing a tread portion of a tire, the steps comprising:
    placing a layer of uncured tire rubber onto a surface;
    cutting the layer of uncured tire rubber to create at least one incision in a predetermined shape in the layer of uncured tire rubber;
    curing a portion of the layer of uncured tire rubber adjacent to the at least one incision and without curing all of the layer of uncured tire rubber;
    repeating said steps of placing a layer, cutting the layer, and curing a portion of the layer using one or more additional layers of uncured tire rubber until the tread portion having a predetermined thickness is formed and at least one sipe is created by adjoining incisions in adjacent layers of the uncured tire rubber such that the incisions are connected to each other; and
    curing the remainder of the layers of uncured tire rubber without eliminating the incisions in the layers of uncured tire rubber.

2. A method of manufacturing a tread portion of a tire as in claim 1, wherein the surface of said step of placing is supported by a tire forming drum.

3. A method of manufacturing a tread portion of a tire as in claim 1, wherein the surface of said step of placing is provided by a tire intermediate.

4. A method of manufacturing a tread portion of a tire as in claim 3, wherein said step of curing the remainder of the tread portion comprises placing the tread portion and the tire intermediate into a curing press.

5. A method of manufacturing a tread portion of a tire as in claim 1, wherein said step of cutting comprises raising the temperature of the portion of the layer of uncured tire rubber above its curing temperature.

6. A method of manufacturing a tread portion of a tire as in claim 1, wherein said step of cutting the layer of uncured tire rubber to create at least one incision comprises creating a plurality of incisions along the layer of uncured tire rubber.

7. A method of manufacturing a tread portion of a tire as in claim 6, wherein said step of repeating creates a plurality of sipes through the layers of uncured tire rubber.

8. A method of manufacturing a tread portion of a tire as in claim 1, wherein the tread portion from said curing step is affixed to a buffed tire so as to retread the tire.

9. A method of manufacturing a tread portion of a tire as in claim 1, wherein the tread portion has sipes that are hidden from view until a certain amount of tread wear has occurred.

10. A method of manufacturing a tread portion of a tire as in claim 1, wherein the amount of the portion of the layer of uncured tire rubber adjacent to the incision that is cured is at least the minimum amount needed to prevent the incision from being eliminated during said step of curing the remainder of the layers of uncured tire rubber.

11. A method of manufacturing a tread portion of a tire as in claim 1, wherein said steps of cutting and curing are executed concurrently.

12. A method of manufacturing a tread portion of a tire as in claim 1, wherein the tread portion has at least one hidden sipe that is concealed by adjacent layers on radially inner and outer sides of the at least one hidden sipe until a certain amount of tread wear has occurred.

* * * * *